United States Patent
Seol et al.

(10) Patent No.: US 11,419,179 B2
(45) Date of Patent: Aug. 16, 2022

(54) METHOD AND APPARATUS FOR EMERGENCY CALL CONNECTION BY ELECTRONIC DEVICE

(71) Applicant: Samsung Electronics Co., Ltd., Gyeonggi-do (KR)

(72) Inventors: Jinhong Seol, Gyeonggi-do (KR); Jiyong Cho, Gyeonggi-do (KR); Dongwoo Kim, Gyeonggi-do (KR); Taeseok Lee, Gyeonggi-do (KR); Jiho Son, Gyeonggi-do (KR); Janghoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/059,560

(22) PCT Filed: Jun. 14, 2019

(86) PCT No.: PCT/KR2019/007182
§ 371 (c)(1),
(2) Date: Nov. 30, 2020

(87) PCT Pub. No.: WO2019/240524
PCT Pub. Date: Dec. 19, 2019

(65) Prior Publication Data
US 2021/0235541 A1 Jul. 29, 2021

(30) Foreign Application Priority Data
Jun. 14, 2018 (KR) .................. 10-2018-0068070

(51) Int. Cl.
*H04W 76/50* (2018.01)
*H04W 4/90* (2018.01)
(Continued)

(52) U.S. Cl.
CPC ............. *H04W 76/50* (2018.02); *H04W 4/90* (2018.02); *H04W 8/18* (2013.01); *H04W 76/15* (2018.02)

(58) Field of Classification Search
CPC ....... H04W 76/50; H04W 76/15; H04W 4/90; H04W 8/18; H04W 48/18; H04W 76/16; H04W 88/06
See application file for complete search history.

(56) References Cited

U.S. PATENT DOCUMENTS

2010/0113010 A1 5/2010 Tenny et al.
2010/0255807 A1 10/2010 Umatt et al.
(Continued)

FOREIGN PATENT DOCUMENTS

KR 10-2011-0133500 A 12/2011
KR 10-2012-0062349 A 6/2012

*Primary Examiner* — Minjung Kim
(74) *Attorney, Agent, or Firm* — Cha & Reiter, LLC

(57) ABSTRACT

Various embodiments of the present invention provide a method and apparatus for an emergency call connection by an electronic device. An electronic device according to various embodiments of the present invention may comprise: a first wireless communication circuit for communicating with a first network; a second wireless communication circuit for communicating with a second network; and a processor, wherein the processor: detects a trigger for an emergency call connection; in response to the trigger, initiates the emergency call connection on the basis of the first wireless communication circuit and the second wireless communication circuit; determines priorities of the first and the second wireless communication circuit; and performs the emergency call connection by using a wireless communication circuit determined according to the determined priorities. Various embodiments are possible.

13 Claims, 9 Drawing Sheets

(51) Int. Cl.
    *H04W 8/18*     (2009.01)
    *H04W 76/15*     (2018.01)

(56)     References Cited

U.S. PATENT DOCUMENTS

| | | | |
|---|---|---|---|
| 2012/0142308 A1* | 6/2012 | Lee | H04W 4/60 |
| | | | 455/404.1 |
| 2013/0150026 A1 | 6/2013 | Ekici et al. | |
| 2015/0003342 A1 | 1/2015 | Swaminathan et al. | |
| 2015/0119103 A1* | 4/2015 | Ngai | H04W 48/18 |
| | | | 455/552.1 |
| 2017/0034677 A1* | 2/2017 | Bodduru | H04W 76/18 |
| 2018/0139788 A1* | 5/2018 | Jhunjhunwala | H04W 76/50 |
| 2018/0338334 A1* | 11/2018 | Jin | G08B 25/016 |

* cited by examiner

METHOD AND APPARATUS FOR EMERGENCY CALL CONNECTION BY ELECTRONIC DEVICE

CROSS-REFERENCE TO RELATED APPLICATION(S)

This application is a National Phase Entry of PCT International Application No. PCT/KR2019/007182, which was filed on Jun. 14, 2019 and claims priority to Korean Patent Application No. 10-2018-0068070, which was filed on Jun. 14, 2018, the contents of which are incorporated herein by reference.

TECHNICAL FIELD

Various embodiments disclose a method and apparatus for an emergency call connection by an electronic device.

BACKGROUND ART

In recent years, services and additional functions provided by electronic devices are gradually expanding. For example, communication service providers or electronic device manufacturers are developing and providing more diverse functions in order to satisfy various needs of users. In addition, recently, networks supporting Internet protocol (IP) multimedia subsystem (IMS) are increasing, and electronic devices using the same are becoming popular. The IMS represents a system that enables, for example, circuit switched (CS)-based services (hereinafter, referred to as "CS services") such as a call or message (e.g., SMS, MMS, etc.) to be used (or serviced) even in a packet switched (PS)-based network. The CS-based network represents a 3GPP network (e.g., a cellular network such as 2G, 3G, or 4G), and may also include a non-3GPP network (e.g., a Wi-Fi network).

An example in which an electronic device uses a CS service by accessing an IMS through a Wi-Fi network may representatively include a voice over Wi-Fi (VoWiFi) service. For example, the VoWiFi service may represent a service that provides a voice call or video call service based on the PS service of the IMS (i.e., via a Wi-Fi network). Accordingly, upon performing a voice call service, an electronic device supporting different domain subsystems may perform a voice call service using, for example, a first communication modem (e.g., a cellular modem) of a cellular domain (or a CS domain) (e.g., a cellular domain such as 2G/3G) or a second communication modem (e.g., a Wi-Fi modem) of a Wi-Fi domain (or a PS domain). In addition, the electronic device may provide an emergency call service in relation to an urgent situation of a user, and may provide, upon sending an emergency call, a function of an emergency call connection through another domain subsystem such as a cellular domain or a Wi-Fi domain.

In the 3GPP standard, when an electronic device executes an emergency call, criteria for selecting a cellular domain or a Wi-Fi domain are specified, and the priority of a domain for the emergency call is used differently for each communication service provider according to network conditions. For example, the electronic device has a function of selecting either a Wi-Fi domain or a cellular domain for domain selection for an emergency call, and may enable a specific communication module related to the selected domain to retry (e.g., redial) an emergency call connection to another domain when the emergency call connection fails.

DISCLOSURE OF INVENTION

Technical Problem

As in an electronic device that supports at least two different domain subsystems, in the case where there are at least two communication modules capable of performing an emergency call connection, a method for an emergency call connection may first attempt to perform an emergency call connection through, for example, a first communication module (e.g., a communication module of a domain configured with priority for each operator), and may then perform an emergency call connection using a second communication module if the attempt fails or does not meet configured conditions.

However, the above-described conventional method may increase the success probability of the emergency call, but on the other hand, it may take a long time to perform the emergency call connection. For example, after the emergency call connection through the first communication module is attempted, if the attempt fails, the emergency call connection is attempted through the second communication module. Therefore, it may take a long time if the second communication module is to be used. Moreover, when the second communication module is, for example, a Wi-Fi communication module, it is necessary to perform a procedure of registering an electronic device in an Internet protocol (IP) multimedia subsystem (IMS) for connection of an emergency call, so that it may take longer for the emergency call connection. Therefore, in the related art, it may not immediately reflect an emergency call connection according to an urgent situation of a user.

In various embodiments, a method and apparatus for an emergency call connection by an electronic device supporting at least two different domain subsystems are disclosed.

In various embodiments, a method and apparatus for an emergency call connection capable of increasing a success probability of an emergency call by an electronic device supporting at least two different domain subsystems while reducing a time required for connection of the emergency call are disclosed.

Solution to Problem

An electronic device according to various embodiments may include: a first communication module configured to communicate with a first network; a second communication module configured to communicate with a second network; and a processor, wherein the processor is configured to: detect a trigger for an emergency call connection; in response to the trigger, initiate the emergency call connection on the basis of the first communication module and the second communication module; determine priorities of the first and second communication modules; and perform the emergency call connection using the communication module according to the determined priorities.

An electronic device according to various embodiments may include: a housing; a user interface configured to be visible or exposed through a portion of the housing; a first wireless communication circuit and a second wireless communication circuit configured to be located inside the housing; at least one processor configured to be located inside the housing and to be operatively connected to the user interface, the first communication circuit and the second communication circuit; and a memory configured to be located inside the housing and to be operatively connected to the at least one processor, wherein the memory stores instructions, when executed, that cause the at least one processor to: receive a user input for requesting an emergency call through the user interface; in response to the user input, make a first attempt for establishing first communication via a first network using the first wireless communication circuit; make a second attempt for establishing second communication via a second network different from the first network using the second wireless communication circuit before the end of the first attempt; receive a connection confirmation signal from at least one of the first network or the second network; select the first network or the second network according to the connection confirmation signal; and execute an emergency call using the selected network.

An operating method of an electronic device according to various embodiments may include: detecting a trigger for an emergency call connection; in response to the trigger, initiating the emergency call connection on the basis of a first communication module and a second communication module; determining priorities of the first communication module and the second communication module; and performing the emergency call connection using the communication module according to the determined priorities.

Advantageous Effects of Invention

According to the electronic device according to various embodiments, it is possible to more efficiently perform an emergency call connection by an electronic device supporting at least two different domain subsystems. According to various embodiments, it is possible to increase a success probability of an emergency call by an electronic device supporting at least two different domain subsystems while reducing a time required for connection of the emergency call. According to various embodiments, it is possible to simultaneously (or substantially simultaneously) attempt an emergency call connection on the basis of at least two communication modules and to immediately perform the emergency call connection to the communication module selected based on the attempted result (e.g., priorities), thereby increasing a success rate for the emergency call.

MODE FOR CARRYING OUT THE INVENTION

Figure 1:
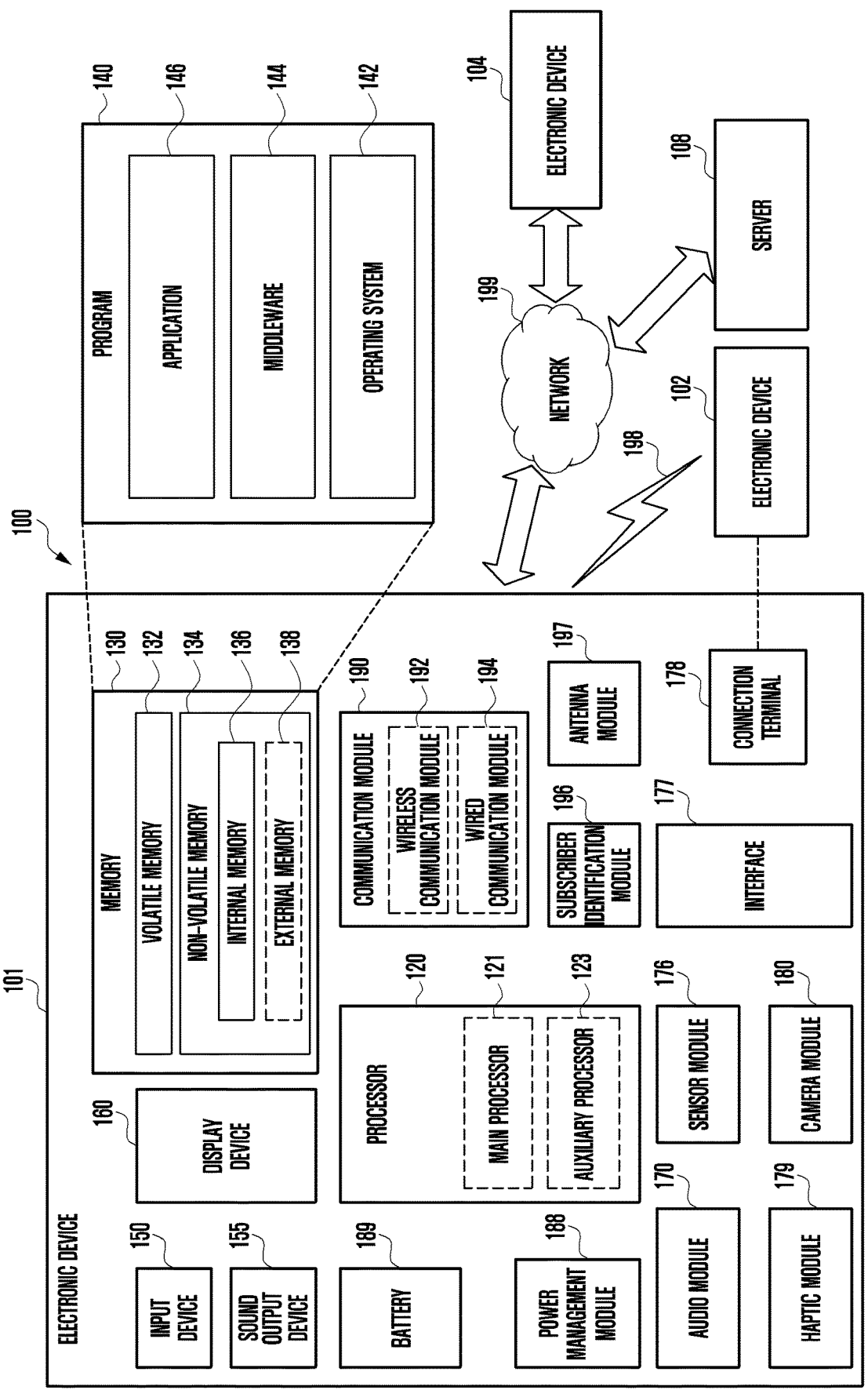
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
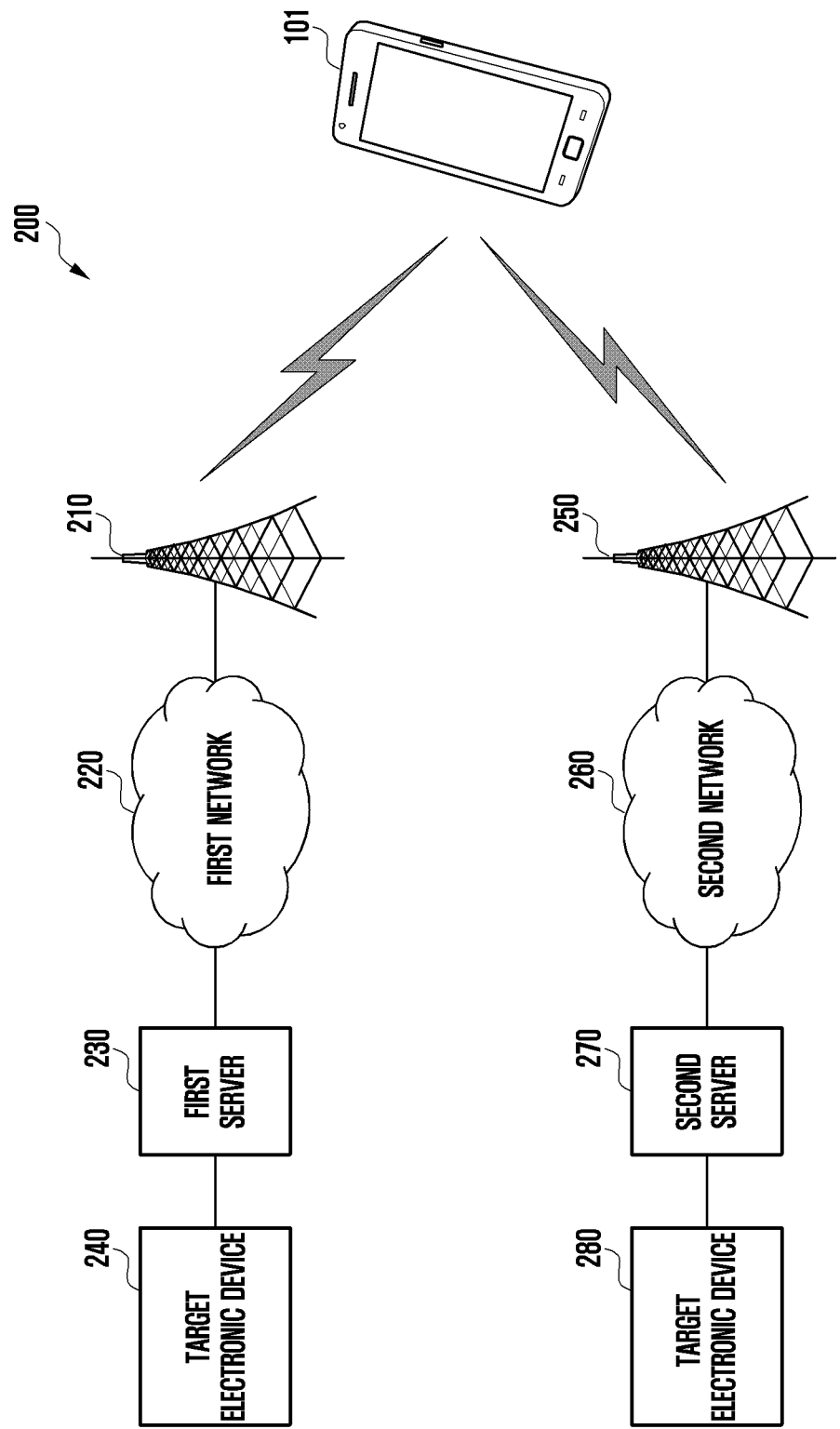
FIG. 2 is a diagram illustrating an example of an operation of performing an emergency call connection in a network environment according to various embodiments.

FIG. 2 is a diagram illustrating an example of an operation of performing an emergency call connection in a network environment 200 according to various embodiments.

Referring to FIG. 2, an electronic device illustrated in FIG. 2 (e.g., the electronic device 101 of FIG. 1) may include a first communication module (e.g., a cellular communication module) for a first domain (e.g., a cellular domain) and a second communication module (e.g., a Wi-Fi communication module) for a second domain (e.g., a Wi-Fi domain). In some embodiments, the electronic device 101 may include a plurality of identification modules (e.g., the subscriber identification module 196 of FIG. 1, a first subscriber identification module (SIM), and a second SIM). According to an embodiment, the identification module may include, for example, a SIM, a universal SIM (USIM), an embedded SIM (eSIM), or the like.

According to various embodiments, the electronic device 101 may include a housing for accommodating various components of the electronic device 101 shown in FIG. 1 (e.g., the processor 120, the memory 130, the display device 160, the communication module 190, the antenna module 197, and the subscriber identification module 196 of FIG. 1). According to an embodiment, the electronic device 101 may include at least one user interface (e.g., the display device 160, the input device 150, etc.) related to an input and/or an output which is visible or exposed through at least a portion of the housing. According to an embodiment, the processor 120 of the electronic device 101 may be located inside the housing, and may be operatively connected to the user interface, the memory 130, and the communication module 190 (e.g., a first wireless communication circuit or a second wireless communication circuit).

According to various embodiments, the electronic device 101 may communicate with a first server 230 (e.g., the server 108 of FIG. 1) through a first network 220 (e.g., a cellular network such as 2G/3G or the second network 199 of FIG. 1), or communicate with a second server 270 (e.g., an Internet protocol (IP) multimedia subsystem (IMS) server) through a second network 260 (e.g., a Wi-Fi network or the first network 198 of FIG. 1). According to an embodiment, the electronic device 101 may access a first base station 210 (e.g., a cellular base station) using a first communication module (not shown) associated with the first network 220 to perform communication through the first network 220. According to an embodiment, the electronic device 101 may access a second base station 250 (e.g., an access point (AP)) using a second communication module (not shown) associated with the second network 260 to perform communication through the second network 260. Hereinafter, for convenience of description, the first base station 210 and the first network 220 may be collectively referred to as "the first network 220" without being classified, and the second base station 250 and the second network 260 may be collectively referred to as "the second network 260" without being classified. In various embodiments, the expression "communication module" refers to a communication module (e.g., the communication module 190 in FIG. 1) itself, or may be used collectively to refer to a communication module and a communication modem (or processor {e.g., the processor 120 of FIG. 1})(e.g., a cellular modem or a Wi-Fi modem) associated with the communication module.

In various embodiments, the first network 220 is a circuit switched (CS)-based network, and may include, for example, a cellular network (or a 3GPP network) such as a 2G network, a 3G network, or an LTE network. According to an embodiment, in connection with an emergency call connection of the electronic device 101, the first network 220 may perform communication through the first communication module (not shown) related to the first network 220 of the electronic device 101 in connection with the emergency call connection of the electronic device 101.

In various embodiments, the second network 260 is a packet switched (PS)-based network, and may include, for example, a Wi-Fi network (or a non-3GPP network) such as a local area network (LAN), a wireless LAN (WLAN), or a wireless personal area network (WPAN). According to an embodiment, the second network 260 may perform communication through the second communication module (not shown) related to the second network 260 of the electronic device 101 in connection with the emergency call connection of the electronic device 101.

As in the above-described example, the first network 220 and the second network 260 represent different domain subsystems, and may be implemented by, for example, different radio access technologies (RATs). For example, the electronic device 101 according to various embodiments may be a device that supports at least two different domain subsystems.

In various embodiments, the first server 230 or the second server 270 is a server that provides information related to the electronic device 101, and may provide information related to subscription of the electronic device 101 to a provider service or connection to a service provider network.

In various embodiments, the electronic device 101 may form (or establish) sessions for sending an emergency call through the first network 220 or the second network 260, and may form a session for an emergency call with a corresponding network connected to any one communication module (e.g., the first communication module or the second communication module).

In various embodiments, in response to a trigger for an emergency call connection by a user, the electronic device 101 may simultaneously (or substantially simultaneously) attempt the emergency call connection to the first network 220 and the second network 260 through the first communication module and the second communication module. For example, the electronic device 101 may attempt to perform an emergency call connection for each of the first communication module and the second communication module.

According to various embodiments, the electronic device 101 may determine the priorities of reception responses corresponding to emergency call requests from the first and second networks 220 and 260 related to the first and second communication modules, and may determine a target communication module for the emergency call connection based on the priorities. For example, the electronic device 101 may determine, as the target communication module, any one of the first network 220 or the second network 260 which first receives a response corresponding to a request for the emergency call connection.

According to various embodiments, if the target communication module is determined, the electronic device 101 may execute an emergency call with a target electronic device 240 or 280 through a corresponding network using the determined target communication module. According to various embodiments, in response to determining the target communication module, the electronic device 101 may stop attempting to perform an emergency call connection by another communication module except the target communication module. For example, the electronic device 101 may transmit a configured signal for stopping an emergency call connection to a network associated with the other communication module, thereby terminating a process related to a connection between the corresponding network and the emergency call. Through this, it is possible to reduce the waste of resources.

Figure 3:
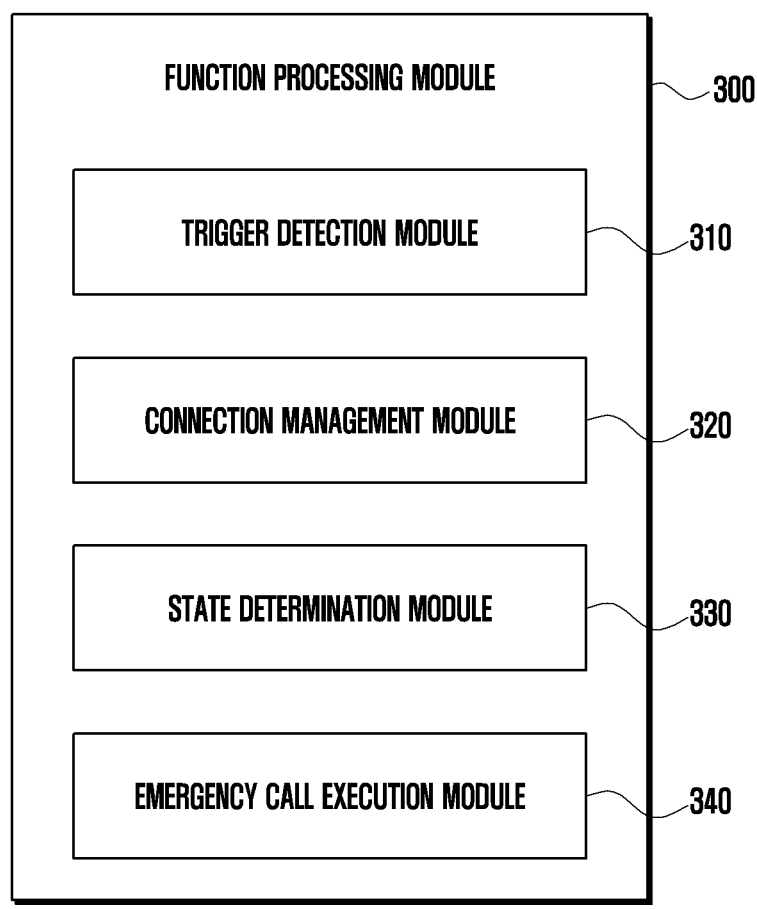
FIG. 3 is a diagram illustrating an example of a function processing module in an electronic device according to various embodiments.

FIG. 3 is a diagram illustrating an example of a function processing module 300 in an electronic device according to various embodiments.

FIG. 3 shows an example of a module 300 (hereinafter, referred to as a "function processing module") that processes a function related to performing an emergency call connection by an electronic device (e.g., the electronic device 101 of FIG. 1). In various embodiments, the function processing module 300 can be included in a processor (e.g., the processor 120 of FIG. 1) including a processing circuitry, as a hardware module or a software module.

Referring to FIG. 3, the function processing module 300 may include a trigger detection module 310, a connection management module 320, a state determination module 330, an emergency call execution module 340, and the like.

According to an embodiment, the trigger detection module 310 may detect that an emergency call is executed by the electronic device 101. For example, in response to reception of an input related to transmission of an emergency call by a user, the trigger detection module 310 may determine the input as a trigger for an emergency call connection. According to an embodiment, the trigger detection module 310 may transmit information (e.g., a trigger signal) related to the start (or initiation) of an emergency call to the connection management module 320 in response to detecting the trigger for the emergency call connection.

According to an embodiment, in response to the execution of the emergency call, the connection management module 320 may transmit information (e.g., an emergency call execution message (or signal)) related to an attempt to perform an emergency call connection, to respective communication modules (e.g., the first communication module and the second communication module) of other domains. In some embodiments, the connection management module 320 may determine a communication state of each communication module and may transmit an emergency call execution message to at least one communication module according to the determination result. In an embodiment, the determination of the communication state may include, for example, determining whether the communication module (or its function) is turned on/off, or whether the communication module is in a state of being connected to a corresponding network (e.g., a service state) or being disconnected from the same (e.g., a non-service state). According to an embodiment, the connection management module 320 may determine a target communication module to execute an emergency call based on a monitoring result of the state determination module 330.

According to an embodiment, the state determination module 330 may determine whether a response corresponding to a request for the emergency call connection is received from the network to the communication module. According to an embodiment, the state determination module 330 is a communication module (e.g., the first communication module and/or the second communication module) to which the emergency call execution message is transmitted, and may monitor whether an alerting indication message by a response message (e.g., the first network {e.g., the first network 220 of FIG. 2}) allowing the emergency call connection or a 183 session progressing message by the second network (e.g., the second network 260 of FIG. 2) is received.

According to an embodiment, the emergency call execution module 340 may perform an emergency call with the target electronic device for the emergency call through a related network using the determined target communication module.

According to various embodiments, the function processing module 300 may be stored in a memory (e.g., the memory 130 of FIG. 1) operatively connected to at least one processor (e.g., the processor 120 of FIG. 1), as instructions. According to an embodiment, the function processing module 300 may store the instructions that are stored in the memory (e.g., the memory 130 of FIG. 1) and may cause the at least one processor to: receive a user input for requesting an emergency call through a user interface (e.g., the display device 160 or the input device 150); make a first attempt to establish first communication via a first network (e.g., the first network 220 of FIG. 2) using a first wireless communication circuit supporting a circuit switched (CS) communication method in response to the user input; make a second attempt to establish second communication via a second network (e.g., the second network 260 of FIG. 2) different from the first network, using a second wireless communication circuit supporting a non-CS communication method before the first attempt is ended; receive a connection confirmation signal from at least one of the first network or the second network; select the first network or the second network according to the connection confirmation signal; and perform an emergency call using the selected network.

According to an embodiment, the function processing module 300 may include an instruction that cause the at least one processor to make the second attempt substantially simultaneously with the first attempt. According to an embodiment, the function processing module 300 may receive a connection confirmation signal from one of the first network or the second network, and may release the connection attempt to the other of the first network or the second network when the connection confirmation signal is received.

Figure 4:
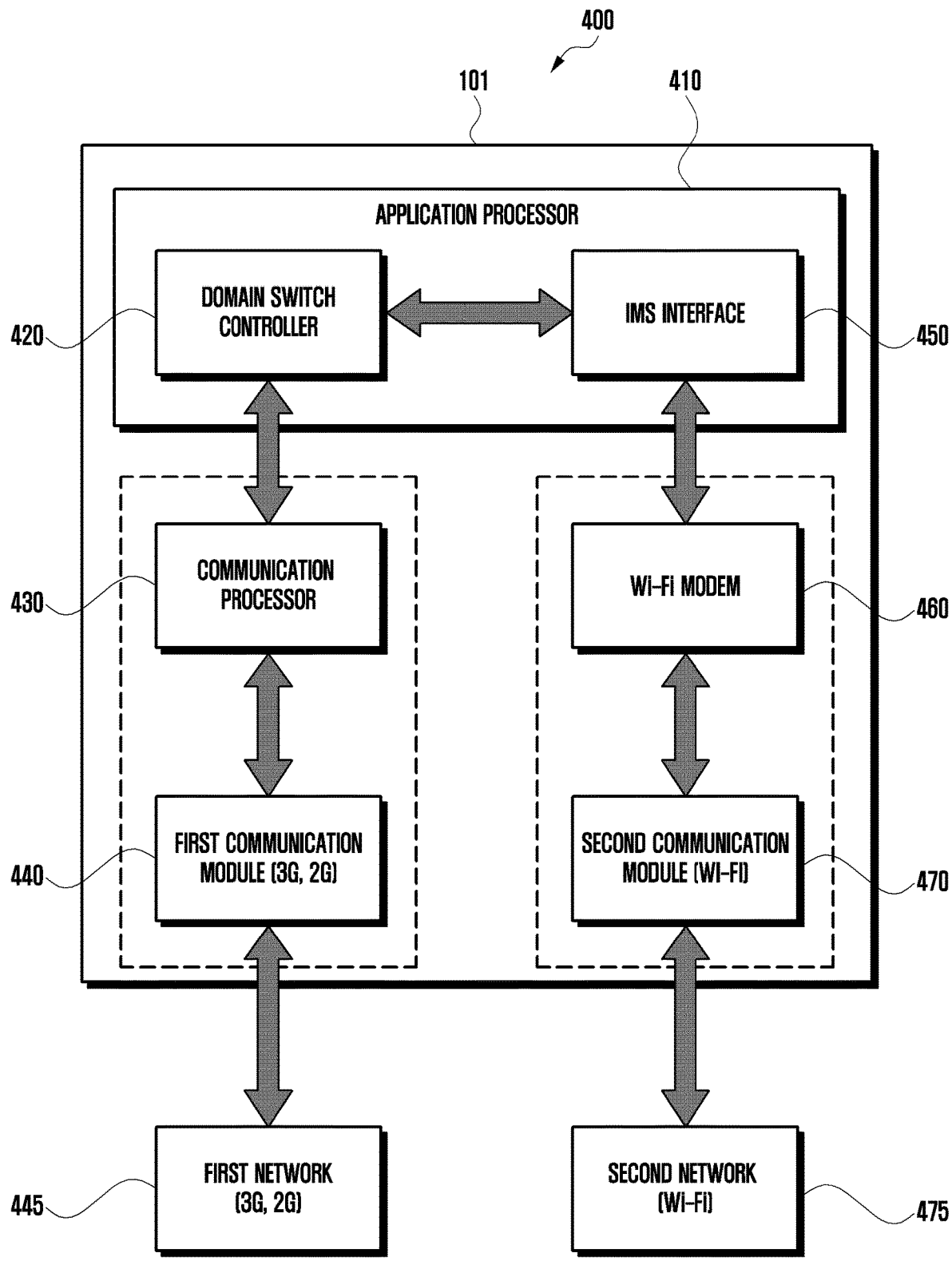
FIG. 4 is a diagram illustrating an example of an internal configuration for an emergency call connection of an electronic device according to various embodiments.

FIG. 4 is a diagram illustrating an example of an internal configuration 400 for an emergency call connection of an electronic device according to various embodiments.

Referring to FIG. 4, the internal configuration of an electronic device (e.g., the electronic device 101 of FIG. 1) for an emergency call connection according to various embodiments may include, for example, an application processor (AP) 410 (e.g., the processor 120 of FIG. 1), a communication processor (CP) 430 (e.g., the processor 120 of FIG. 1), a first communication module 440, a Wi-Fi modem 460, and a second communication module 470. In various embodiments, the application processor 410 may further include a domain switch controller 420 and an IMS interface 450.

According to an embodiment, the application processor 410 may include an application layer, an application framework layer, and a library layer.

In an embodiment, the application layer may represent a region in which an application (e.g., the application 146 of FIG. 1) is driven. For example, in the application layer, an IMS application, a non-IMS application, and an application executable in the electronic device 101 may be driven.

In an embodiment, the application framework layer may connect the application layer and the library layer.

In an embodiment, the library layer may include modules necessary to provide IMS services, such as an IMS library including an IMS protocol stack, a video engine and an audio engine, and such as a radio interface layer (RIL), TCP/IP, and enhanced packet data gateway (ePDG) client.

The IMS library may include devices and software necessary to drive the IMS protocol stack and the IMS application. For example, the IMS protocol stack may include protocols defined in the IMS standard, such as a session initiation protocol (SIP), a session description protocol (SDP), a real time protocol (RTP), an RTP control protocol (RTCP), a real time streaming protocol (RTSP), a message session reply protocol (MSRP), a hypertext transfer protocol (HTTP), and the like. In addition, the video engine and audio engine in the IMS library may include devices and software necessary to process video data and audio data. For example, the video engine may include devices and software necessary to process video data, and the audio engine may include devices and software necessary to process audio data.

The TCP/IP is an Internet standard protocol and may represent a set of protocols prescribed for performing data communication between nodes (or the electronic devices 101). The ePDG client may receive an SIP message or voice packet data provided through the Wi-Fi modem 460. The location of the ePDG client is not limited to the application processor 410 and may be included in the communication processor 420 or configured separately.

The RIL is an operating system for the electronic device 101, and may provide an interface between, for example, a CellCore layer of an operating system (OS) and a radio protocol stack in the communication processor 430. In addition, the RIL may connect between a communication processing module, such as a short message service (SMS), voice communication, or data communication, and an attention (AT) command (or Hayes command) or a proprietary communication protocol.

According to various embodiments, an inter process communication (IPC) driver (not shown) may be included between the application processor 410 and the communication processor 430. The IPC may represent an interface path between the application processor 410 and the communication processor 430, and the application processor 410 and the communication processor 430 may communicate with each other through the IPC.

According to an embodiment, the domain switch controller 420 may switch between a first domain (e.g., a cellular domain) and a second domain (e.g., a Wi-Fi domain or an IMS domain) based on the control of the application processor 410. For example, when performing an emergency call connection with a second network 475 (e.g., the second network 260 of FIG. 2) through the second communication module 470 related to the second domain, the domain switch controller 420 may switch the domain for the emergency call to the second domain, and allow a connection to the Wi-Fi modem 460 through the IMS interface 450.

According to an embodiment, the IMS interface 450 may include an interface for connecting the application processor 410 and the Wi-Fi modem 460 for an IMS emergency call connection using VoWiFi of the electronic device 101.

According to an embodiment, the communication processor 430 may provide a voice call or a video call through 2G, 3G, 4G, or long term evolution (LTE), and may process communication with an external network (e.g., the first network 445 {e.g., the first network 220 of FIG. 2}) according to a corresponding protocol stack. For example, the communication processor 430 may include a plurality of submodules such as an interface (not shown) with a radio frequency (RF) system (not shown), a physical layer (not shown), a protocol stack (not shown), etc. In an embodiment, the first network 445 may include a cellular network such as 2G or 3G. For example, the first network 445 may include a global system for mobile communication (GSM) network, an enhanced data GSM environment (EDGE) network, a code division multiple access (CDMA) network, a W-code division multiple access (W-CDMA) network, an LTE network, an orthogonal frequency division multiple access (OFDMA) network, and the like, but is not limited thereto. In addition, the communication processor 430 may include TCP/IP including an Internet standard protocol, a voice engine (not shown) for processing voice signals, and the like. The communication processor 430 may further include various components in addition to the illustrated components. According to an embodiment, the communication processor 430 may process transmission and reception of data related to an emergency call based on circuit switched (CS).

According to an embodiment, the Wi-Fi modem 460 may transmit and receive the SIP message or voice packet data to and from an external network (e.g., the second network 475) according to a corresponding communication protocol (e.g., IEEE 802.11). In an embodiment, the second network 475 may include a Wi-Fi network. According to an embodiment, the Wi-Fi modem 460 may process transmission and reception of data related to the emergency call based on packet switched (PS) (or using VoWiFi).

According to various embodiments, the electronic device 101 may include an external electronic device (e.g., the electronic device 102 of 104 of FIG. 1 and the server 108 of FIG. 1, or the target electronic device 240 or 280 of FIG. 2 and the first server 230 and the second server 270 of FIG. 2) and a plurality of communication modules (e.g., the first communication module 440 or the second communication module 470) capable of providing voice or data communication.

In various embodiments, the communication modules 440 and 470 may include various communication modules capable of providing voice or data communication. According to an embodiment, the first communication module 440 may include a module (or a wireless communication circuit) capable of providing a cellular communication method such as 2G, 3G, 4G, or LTE. For example, the first communication module 440 may support a circuit switched (CS) communication method. According to an embodiment, the second communication module 470 may include a module (or a wireless communication circuit) capable of providing an IMS-based communication method. For example, the second communication module 470 may support a non-CS communication method. In various embodiments, the first communication module 440 and the second communication module 470 may use different frequencies. In various embodiments, the first communication module 440 and the second communication module 470 may independently perform a voice call or a video call, or may perform a voice call or a video call in parallel with another communication module.

According to various embodiments, the first network 445 and the second network 475 may be implemented with different RATs using different frequency bands (or frequency ranges) (e.g., a first frequency band of cellular and a second frequency band of Wi-Fi). According to an embodiment, the first frequency band (or range) may include, for example, a range of 800 MHz to 2.1 GHz, and the first communication module 440 may transmit and receive a first signal in the first frequency band. According to an embodiment, the second frequency band (or range) may include a range outside the first frequency range, for example, 2 GHz to 5 GHz, and the second communication module 470 may transmit and receive a second signal in the second frequency band outside the first frequency band.

According to various embodiments, the electronic device 101 may use physically separated antennas (e.g., the antenna module 197 of FIG. 1) (e.g., a first antenna {e.g., a main communication antenna} and a second antenna {e.g., a Wi-Fi antenna}), respectively, to send emergency calls at the same time, and may transmit an emergency call in parallel through different communication modules (e.g., the first communication module 440 and the second communication module 470) using RATs having different usage frequencies. According to an embodiment, the first antenna and the second antenna may be configured to be spaced apart from each other, where the first communication module 440 may be electrically connected to the first antenna and the second communication module 470 may be electrically connected to the second antenna.

According to various embodiments, the application processor 410 of the electronic device 101 may control the first communication module 440 through the communication processor 430 to initiate an emergency call connection with the first network 445, and may control the second communication module 470 through the Wi-Fi modem 460 to initiate an emergency call connection with the second network 475. For example, in response to detecting a trigger related to an emergency call, the application processor 410 may simultaneously (or substantially simultaneously) transmit an emergency call execution message to the first communication module 440 and the second communication module 470. According to various embodiments, an operation for an emergency call connection may be simultaneously initiated through the first communication module 445 and the second communication module 475 without configuring a separate reference condition for the initiation of the emergency call.

According to various embodiments, in case of performing an emergency call connection based on a first domain, the application processor 410 may establish a connection by performing signaling with a base station (e.g., the first base station 210 or the first network 220 of FIG. 2) (e.g., the first network 445) through a 2G/3G protocol stack of the communication processor 430, and may then provide an emergency call service by processing audio data for the emergency call service.

According to various embodiments, when performing an emergency call connection based on the second domain, the application processor 410 may establish a connection by performing signaling with a base station (e.g., the second base station 250 or the second network 260 of FIG. 2) (e.g., the second network 475) through an IMS protocol stack of the Wi-Fi modem 460, and may then provide an IMS emergency call service by processing audio data for the emergency call service. According to an embodiment, when performing an emergency call connection via the second network 475 through the second communication module 470, the application processor 410 may switch a corresponding domain to an IMS domain through the domain switch controller 420, and may connect to the Wi-Fi modem 460 through the IMS interface 450 to process image data and audio data provided through the Wi-Fi modem 460.

According to various embodiments, the application processor 410 may determine a target communication module to perform an emergency call connection based on a response related to the emergency call connection from any one of the first communication module 440 and the second communication module 470. According to an embodiment, when the response related to the emergency call connection is first fed back (or received) from a corresponding network through any one of the first communication module 440 and the second communication module 470, the application processor 410 may determine the corresponding communication module as the target communication module.

According to an embodiment, the application processor 410 may stop an attempt to perform an emergency call connection by a domain related to another communication module while performing an emergency call connection through the domain related to the target communication module. When performing a session related to an emergency call connection through the Wi-Fi modem 460, the application processor 410 may transmit a termination message for terminating an attempt to perform an emergency call connection by the communication processor 430. According to an embodiment, when performing a session related to an emergency call connection through the communication processor 430, the application processor 410 may transmit a termination message for terminating an attempt to perform an emergency call connection by the Wi-Fi modem 460.

According to an embodiment, when there are at least two communication modules (e.g., a first communication module and a second communication module) capable of sending an emergency call, the conventional method for an emergency call connection may be a method for first attempting an emergency call through, for example, a first communication module and then using a second communication module when the corresponding attempt fails or does not meet a corresponding condition. For example, in the related art, when emergency call transmission starts, an emergency call execution message may be transmitted to a first communication module, and a reference condition may be configured immediately after the transmission of the execution message. The reference condition may include, for example, expiration of a timer, the number of times an emergency call connection starts exceeding a predetermined number, etc., and when such a reference condition is satisfied, an emergency call execution message may be transmitted to the second communication module to attempt to perform an emergency call connection. Therefore, in the related art, it may take a long time to perform an emergency call connection. For example, in a situation in which an emergency call is possible only by the second communication module, a corresponding operation may be attempted through the first communication module, the corresponding attempt may fail, and may then an emergency call connection may be possible through the second communication module. In the conventional description, the first communication module and the second communication module may be changed according to the requests of an operator.

A method for an emergency call connection according to various embodiments may simultaneously transmit an emergency call execution message to the first communication module 440 and the second communication module 470. For example, when the emergency call is triggered, the application processor 410 may simultaneously (e.g., substantially simultaneously) transmit an emergency call execution message to the first communication module 440 and the second communication module 470. Next, in response to receiving a response message to a request for the emergency call connection from the first network 445 related to the first communication module 440 or the second network 475 related to the second communication module 470, the application processor 410 may determine a target communication module for the emergency call connection.

In various embodiments, the response message (or an alert message) may include, for example, a first message (e.g., an alerting indication message) received from the first network 445 and a second message (e.g., 183 session progressing message) received from the second network 475. An operation in which the response message (or the alert message) according to various embodiments is transmitted will be described with reference to the example of FIG. 7 to be described later.

According to an embodiment, when the first message is first received from the first network 445 through the first communication module 440, the application processor 410 may determine the first communication module 440 as the target communication module for emergency call connection. According to an embodiment, when the second message is first received from the second network 475 through the second communication module 470, the application processor 410 may determine the second communication module 470 as the target communication module for emergency call connection.

When the target communication module is determined, for example, when a connection for an emergency call with a corresponding network is established according to the reception of the response message of any one communication module, the application processor 410 may immediately transmit a call release message to other communication modules in the RIL layer, thereby terminating a call connection procedure for an emergency call.

As described above, according to various embodiments, a failure rate due to an emergency call connection may be reduced compared to the conventional method, and the emergency call connection may be possible faster than the conventional method. A scenario related to this will be described below with reference to FIG. 4.

For example, according to the conventional method, an emergency call may be sent to a CS domain, and if an available RAT is not searched, a failure may be processed, and the domain switch controller 420 may arbitrarily process a timeout and may attempt a connection again through VoWiFi. In this case, an emergency call connection may be established in approximately 3 seconds. On the other hand, according to various embodiments, it is possible to reduce a waiting time for a predetermined time according to the failure after searching for an available RAT and a time required for notifying the domain switch controller 420 of the failure. Therefore, it is possible to reduce a time wasted to send an emergency call in the CS domain.

As another example, according to the conventional method, even when an emergency call is sent through VoWiFi and a response is not received from the second network 475 (e.g., an IMS server), a timeout may occur, and may then a connection to the CS domain may be attempted again. In this case, a certain period of time may elapse until the timeout occurs after an emergency call attempt through VoWiFi. On the other hand, according to various embodiments, it is possible to reduce a time (e.g., approximately 20 seconds) required to process a timeout due to not receiving a response from the second network 475 and a time required to notify the domain switch controller 420 of the failure.

As another example, there may occur a case where an emergency call is sent through VoWiFi, a channel for an emergency call connection (e.g., an enhanced IMS (EIMS) packet data network (PDN) connection) is established, and then all packets transmitted to a corresponding interface (e.g., an EIMS PDN interface) from the kernel (or platform) of the electronic device 101 are all dropped (e.g., all packets are dropped to EIMS PDN interface down due to the kernel (or platform) issue). The second communication module 470 may transmit a notification of the failure to the domain switch controller 420 and may then attempt to reconnect to the CS domain through the first communication module 440. In this case, a certain period of time may elapse until a time when a packet drop is confirmed after the emergency call is sent through VoWiFi. On the other hand, according to various embodiments, it is possible to reduce a time required to check the packet drop and a time required to notify the domain switch controller 420 of the failure.

As another example, there may occur a case where an emergency call is sent through VoWiFi, a channel for an emergency call connection (e.g., EIMS PDM connection) is established (e.g., emergency access point name (APN) establishment), and then a response to an SYN packet fails to be received from the second network 475 when a TCP 3-way handshake attempt is made to transmit an invitation message to the second network 475 (e.g., IMS server). In this case, a predetermined period of time may elapse until a time point for waiting for a response from the second network 475 after sending the emergency call through VoWiFi. On the other hand, according to various embodiments, it is possible to reduce a time required to perform TCP retransmission for the response to the SYN packet for a predetermined number of repetitions and a time required to notify the domain switch controller 420 of the corresponding information.

As described above, the electronic device 101 according to various embodiments may include: the first communication module 440 configured to communicate with the first network 445; the second communication module 470 configured to communicate with the second network 475; and the processor 120 (e.g., the application processor 410), wherein the processor 120 is configured to: detect a trigger for an emergency call connection; in response to the trigger, initiate the emergency call connection on the basis of the first communication module and the second communication module; determine priorities of the first and second communication modules; and perform the emergency call connection using the communication module according to the determined priorities.

According to various embodiments, an execution message for the emergency call connection may be simultaneously transmitted to the first communication module 440 and the second communication module 470.

According to various embodiments, the processor 120 may determine the priorities on the basis of reception of a response message from a network corresponding to each of the first communication module 440 and the second communication module 470.

According to various embodiments, the processor 120 may determine any one of the first communication module 440 or the second communication module 470 which first receives the response message from the corresponding network, as a target communication module for the emergency call connection.

According to various embodiments, the processor 120 may transmit a termination message for terminating initiation of the emergency call connection to another communication module except the target communication module.

According to various embodiments, in response to the trigger, the processor 120 may: determine the communication state of the first communication module 440 and the second communication module 470; simultaneously transmit an emergency call execution message to the first communication module 440 and the second communication module 470 when the first communication module 440 and the second communication module 470 are in a communication connected state; transmit the emergency call execution message to the first communication module 440 when the first communication module 440 of a cellular domain is in a communication connected state; and simultaneously transmit the emergency call execution message to the first communication module 440 and the second communication module 470 when the second communication module 470 of a packet switched (PS) domain is in a communication connected state.

According to various embodiments, the electronic device 101 may: include a first subscriber identification module (SIM) and a second SIM; determine a camp-on network for each of the first SIM and the second SIM; and determine an emergency call connection method for the first communication module 440 and the second communication module 460 on the basis of the determination of the camp-on network.

According to various embodiments, the first communication module 440 and the second communication module 470 may be configured to use different radio access technologies (RATS).

According to various embodiments, the first communication module 440 and the second communication module 470 may be formed to use different antennas that are physically separated.

According to various embodiments, the first network 445 and the second network 475 may use different frequency bands.

As described above, the electronic device 101 according to various embodiments may include: a housing; a user interface configured to be visible or exposed through a portion of the housing; a first wireless communication circuit and a second wireless communication circuit configured to be located inside the housing; at least one processor configured to be located inside the housing and to be operatively connected to the user interface, the first communication circuit, and the second communication circuit; and a memory configured to be located inside the housing and to be operatively connected to the at least one processor, wherein the memory stores instructions, when executed, that cause the at least one processor to: receive a user input for requesting an emergency call through the user interface; in response to the user input, make a first attempt for establishing first communication via a first network using the first wireless communication circuit; make a second attempt for establishing second communication via a second network different from the first network using the second wireless communication circuit before the end of the first attempt; receive a connection confirmation signal from at least one of the first network or the second network; select the first network or the second network according to the connection confirmation signal; and execute an emergency call using the selected network.

According to various embodiments, the instructions may cause the at least one processor to make the second attempt at substantially the same time as the first attempt.

According to various embodiments, the instructions may cause the at least one processor to: receive a connection confirmation signal from any one of the first network or the second network, and release the connection attempt to the other of the first network or the second network when the connection confirmation signal is received.

According to various embodiments, the first wireless communication circuit and the second wireless communication circuit may use different frequencies.

According to various embodiments, the first wireless communication circuit may be configured to transmit and/or receive a first signal within a first frequency range of 800 MHz to 2.1 GHz, and the second wireless communication circuit may be configured to transmit and/or receive a second signal within a second frequency range outside the first frequency range.

According to various embodiments, the second frequency range may include a range of 2 GHz to 5 GHz.

According to various embodiments, the electronic device may further include a first antenna and a second antenna spaced apart from the first antenna, where the first wireless communication circuit may be electrically connected to the first antenna and the second wireless communication circuit may be electrically connected to the second antenna.

According to various embodiments, the electronic device may further include a first socket and a second socket capable of accommodating a first subscriber identification module (SIM) and a second SIM, where the first wireless communication circuit may be connected to the first network using the first SIM and the second wireless communication circuit may be connected to the second network using the second SIM.

According to various embodiments, the first wireless communication circuit may support a circuit switched communication method, and the second wireless communication circuit may support a non-circuit switched communication method.

Figure 5:
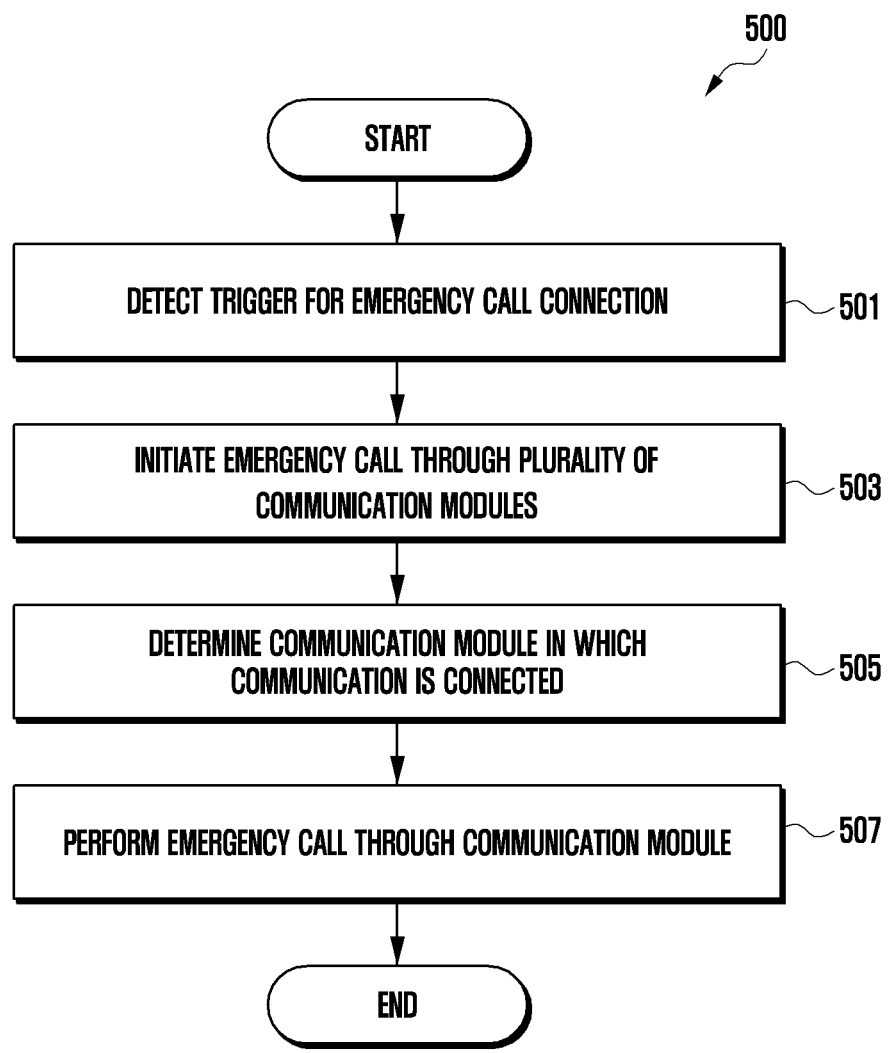
FIG. 5 is a flowchart illustrating an operating method of an electronic device according to various embodiments.

FIG. 5 is a flowchart 500 illustrating an operating method of an electronic device according to various embodiments.

Referring to FIG. 5, in operation 501, the processor 120 (e.g., at least one processor including a processing circuit, the function processing module 300 of FIG. 3, or the application processor 410 of FIG. 4) of an electronic device (e.g., the electronic device 101 of FIG. 1) may detect a trigger for an emergency call connection. According to an embodiment, a user of the electronic device 101 may manipulate the electronic device 101 to perform an input operation (e.g., inputting an emergency number and dial out button, or inputting a gesture of a predetermined pattern {or shortcut button} for automatic sending of an emergency call) for an emergency call connection for an emergency situation. When detecting the input operation by the user, the processor 120 may determine the detection as the trigger related to the emergency call.

In operation 503, the processor 120 may initiate the emergency call connection through a plurality of communication modules. According to various embodiments, the electronic device 101 may include a plurality of communication modules such as a first communication module (e.g., the first communication module 440 of FIG. 4) and a second communication module (e.g., the second communication module 470 of FIG. 4). In various embodiments, the processor 120 may simultaneously transmit an emergency call execution message for the emergency call to each of the plurality of communication modules (e.g., the first communication module and the second communication module) for the emergency call.

According to an embodiment, the plurality of communication modules may include, for example, the first communication module that is a cellular communication method and the second communication module that is a short-range communication method. The first communication module may use at least one of, for example, 2G, 3G, 4G, or LTE communication methods. The second communication module may use at least one of Wi-Fi and Bluetooth communication methods. According to various embodiments, in addition to the above-described methods, the first communication module and the second communication module may include various communication methods capable of performing an emergency call and communication modules corresponding thereto. According to an embodiment, the processor 120 (e.g., the application processor 410 of FIG. 4) may transmit an emergency call execution message to a communication processor (e.g., the communication processor 430 of FIG. 4) to perform the emergency call, and at the same time, may transmit an IPC message to a Wi-Fi modem (e.g., the Wi-Fi modem 460 of FIG. 4) to perform the emergency call. According to various embodiments, each communication module receiving the emergency call execution message from the processor 120 may initiate a procedure related to the emergency call connection with each of the corresponding networks (e.g., the first network 445 and the second network 475 of FIG. 4).

In operation 505, the processor 120 may determine the communication module in which communication for the emergency call via the network is established (or the emergency call connection is successfully performed). According to an embodiment, the processor 120 may determine the communication module that first succeeds in performing the emergency call connection among a plurality of communication modules. For example, the processor 120 may determine, as a target communication module for the emergency call, the communication module that first receives a response (e.g., a first message {alert message} by the first network 445 of FIG. 4 or a second message {183 session processing message} by the second network 475) corresponding to a connection request for the emergency call from the corresponding network.

In operation in operation 507, when the target communication module (e.g., the communication module that first successfully performs the emergency call connection) is determined among the plurality of communication modules, the processor 120 may perform the emergency call through the determined target communication module. According to an embodiment, the execution of the emergency call may include, for example, transmission of a user's voice or transmission of a text message written in advance by the user to a predetermined organization or an electronic device of a predetermined recipient. According to various embodiments, the processor 120 may perform an operation of terminating the initiation of the emergency call connection using another communication module except the target communication module among the plurality of communication modules. For example, the processor 120 may transmit a message for terminating the initiation of the emergency call connection to the other communication module except the communication module that has successfully connected the emergency call. According to an embodiment, the other communication module may terminate the initiation of the emergency call connection in response to receiving the termination message from the processor 120.

Figure 6:
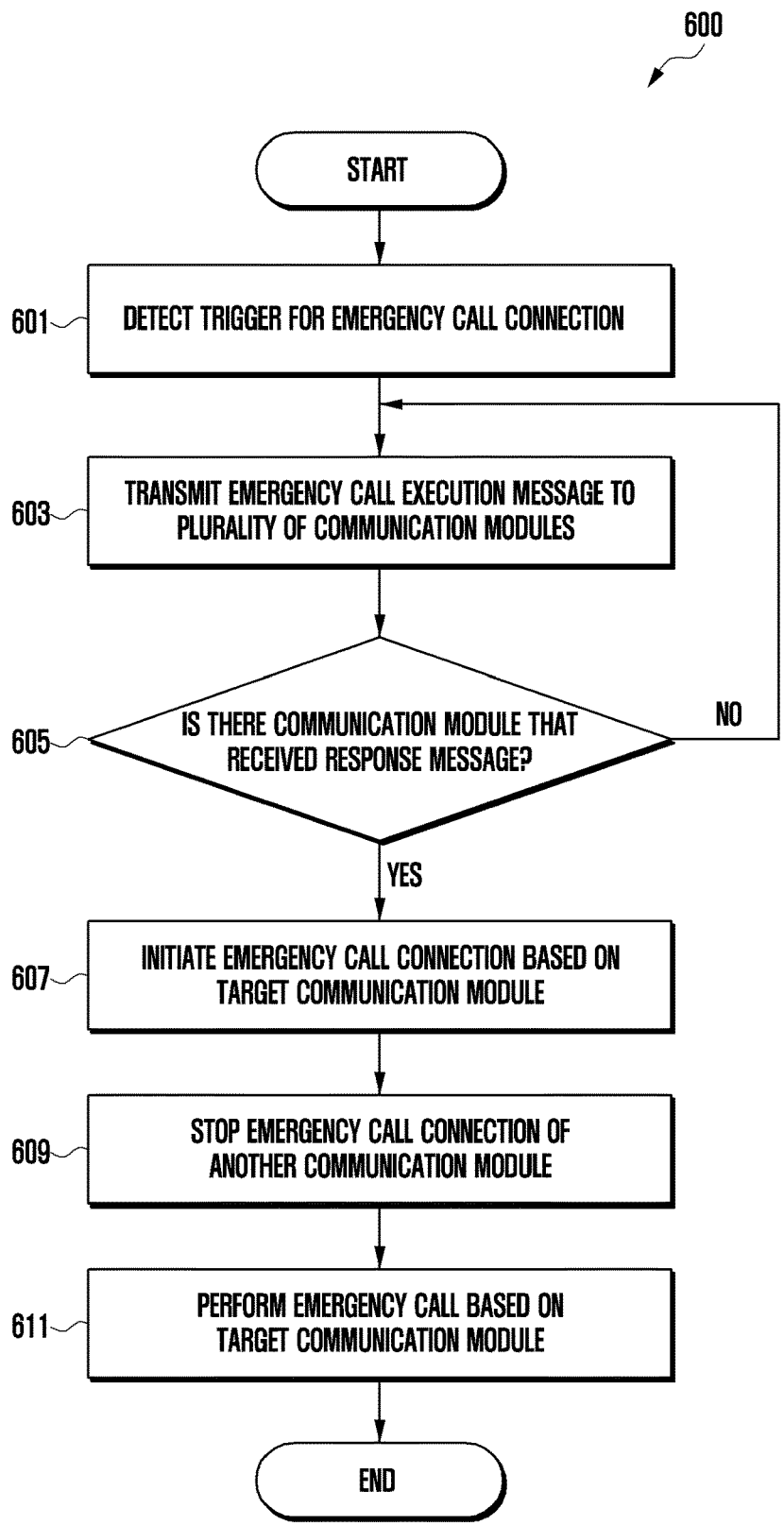
FIG. 6 is a flowchart illustrating an operating method of an electronic device according to various embodiments.

FIG. 6 is a flowchart 600 illustrating an operating method of an electronic device according to various embodiments.

Referring to FIG. 6, in operation 601, the processor 120 of an electronic device (e.g., the electronic device 101 of FIG. 1) may detect a trigger (hereinafter, referred to as "trigger related to an emergency call") for an emergency call connection.

In operation 603, in response to detecting the trigger related to the emergency call, the processor 120 may simultaneously transmit an emergency call execution message to a plurality of communication modules (e.g., the first communication module 440 and the second communication module 470 of FIG. 4). According to an embodiment, the first communication module may support, for example, a 2G, 3G, 4G, or LTE communication method, and the second communication module may indicate communication modules of different domains supporting a Wi-Fi communication method.

In operation 605, the processor 120 may determine whether there is a communication module that receives a response message from a network related to each communication module. For example, the processor 120 may determine whether there is a communication module to which communication for an emergency call via a network is established (or has successfully connected an emergency call). According to an embodiment, the processor 120 may determine a communication module with a priority (e.g., which is first successfully connected the emergency call) among the plurality of communication modules. For example, the processor 120 may determine, as a target communication module for the emergency call, the communication module that first receives a response (e.g., a first message {alerting indication message} by the first network 445 of FIG. 4 or a second message {183 session processing message} by the second network 475) corresponding to a connection request for the emergency call from the corresponding network.

In operation 605, when there is no communication module that has received the response from the network (NO in operation 605), the processor 120 may wait for reception of the response, and may proceed to operation 603 to perform operations below operation 603. For example, the processor 120 may repeatedly perform the above operation until the emergency call is performed, or may repeatedly perform the above operation for a predetermined time (or number of times).

When there is a communication module that has received the response from the network in operation 605, (YES of operation 605), in operation 607, the processor 120 may initiate the emergency call connection on the basis of the target communication module. For example, the processor 120 may determine, as the target communication module, a communication module that first receives a response corresponding to a request for the emergency call connection of the electronic device 101 from the corresponding network from any one of the first communication module 440 and the second communication 470. The processor 120 may perform the emergency call connection with the corresponding network on the basis of the determined target communication module.

In operation 609, the processor 120 may stop the emergency call connection by another communication module except the target communication module sequentially or in parallel. For example, the processor 120 may transmit a message for terminating the emergency call connection initiation to the other communication module except the target communication module. According to an embodiment, the other communication module may terminate an operation of initiating the emergency call connection with the corresponding network in response to receiving the termination message from the processor 120. According to an embodiment, the processor 120 may transmit a message for terminating an emergency call connection attempt to the corresponding network through the other communication module, thereby terminating a session for emergency call connection.

In operation 611, the processor 120 may perform the emergency call on the basis of the target communication module. According to an embodiment, the execution of the emergency call may include, for example, transmission of a user's voice or transmission of a text message written in advance by the user to a predetermined organization or an electronic device (e.g., the electronic device 102 or 104 of FIG. 1, and the server 108 of FIG. 1 or the target electronic device 240 or 280 of FIG. 2 and the first server 230 and the second server 270 of FIG. 2) of a predetermined recipient.

Figure 7:
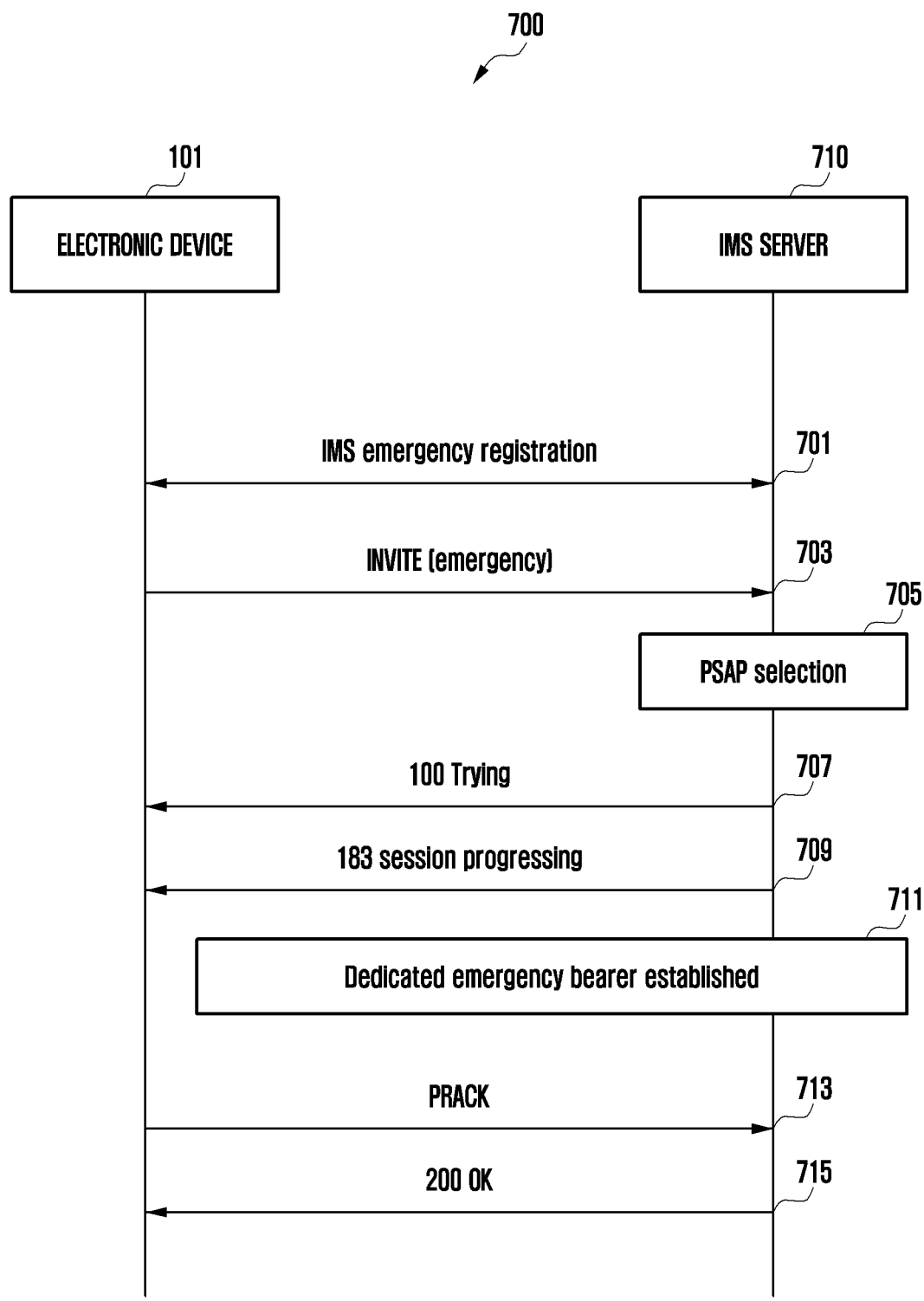
FIG. 7 is a signal flow diagram illustrating an example of an emergency call connection operation between an electronic device and a network according to various embodiments.

FIG. 7 is a signal flow 700 diagram illustrating an example of an emergency call connection operation between an electronic device and a network according to various embodiments.

As shown in FIG. 7, FIG. 7 shows a signal transmission/reception relationship between an electronic device (e.g., the electronic device 101 of FIG. 1) according to various embodiments and an IMS network 710 of a second network (e.g., the second network 260 of FIG. 2, the second network 475 of FIG. 4, or the IMS server 710), for example, an operation example of an IMS emergency call. For example, FIG. 7 shows an example in which the electronic device 101 requests a connection request for an emergency call and the second network provides a related response (e.g., 183 session processing message) corresponding to the request to the electronic device 101.

Referring to FIG. 7, in operation 701, the electronic device 101 may transmit a registration request message (e.g., IMS emergency registration) for registering the electronic device 101, to the IMS server 710 of the second network (e.g., Wi-Fi network). For example, in order for the electronic device 101 to perform an emergency call through the second network, the electronic device 101 must be registered in the IMS server 710, and may transmit a request message for registration of the electronic device 101 to the IMS server 710 through the second network. According to an embodiment, the electronic device 101 may perform a procedure for exchanging the capabilities of the electronic device 101 to perform an IMS emergency call between the second networks and confirming whether an appropriate resource is currently present, and may then a procedure for registering the electronic device 101 in the IMS server 710.

In operation 703, after registering the electronic device 101 in the IMS server 710, the electronic device 101 may request the start of an emergency session from the IMS server 710 to perform the emergency call. For example, the electronic device 101 may transmit an invitation message for the emergency call to the IMS server 710.

In operation 705, the IMS server 710 may select (PSAP selection) a public safety answering point (PSAP) (e.g., a dedicated call center that handles emergency calls) in response to the request of the electronic device 101. For example, the IMS server 710 may select the PSAP corresponding to the location of the electronic device 101. To this end, the IMS server 710 may perform a PSAP selection procedure capable of processing the IMS emergency call from the electronic device 101.

In operation 707, when the PSAP is selected, the IMS server 710 may transmit a message (e.g., a 100 trial message) allowing the emergency call connection of the electronic device 101 to the electronic device 101. In operation 709, the IMS server 710 may transmit a message for session connection (e.g., 183 session progressing message) to the electronic device 101. In various embodiments, the message for session connection (e.g., 183 session progressing message) may be used as a response message corresponding to a connection request of the emergency call from the electronic device 101. According to an embodiment, the IMS server 710 may provide the 100 trial message or the 183 session progressing message to the electronic device 101 in response to the invitation request from the electronic device 101.

Based on receiving the response message, the electronic device 101 may form (or establish) a dedicated emergency bearer with the IMS server 710 as shown in operation 711.

In operation 713, the electronic device 101 may transmit a provisional response ACKnowledgement (PRACK). For example, the electronic device 101 may transmit a reliable provisional ACK for a session that has not yet been established. For example, the PRACK may be generated by the electronic device 101 before receiving a final response such as 200 OK from the IMS server 710 for the invitation (INVITE) of the electronic device 101, and the response of the electronic device 101 to the 183 session progressing of the IMS server 710 may be included in the PRACK.

In operation 715, the IMS server 710 may transmit the final response to the invitation (INVITE) of the electronic device 101 using a 200 OK message.

According to various embodiments, an emergency call execution message may be simultaneously transmitted to the first communication module 440 and the second communication module 470, each communication module may request a connection related to the emergency call from the corresponding network, and a target communication module for the emergency call may be determined based on receiving a response message (or alert message) thereto. As this example, FIG. 7 shows an example of receiving the response message from the IMS network (e.g., IMS server 710). Even in a legacy network (e.g., 2G/3G network), that is, the first network 445 according to various embodiments, the response message (e.g., alerting indication message) may be provided to the electronic device 101 in a similar method to that of FIG. 7.

According to various embodiments, when determining the target communication module having a priority among the plurality of communication modules, the communication module in which a notification message (e.g., alerting indication message or 183 session progressing message) is first received may be determined as the target communication module.

Figure 8:
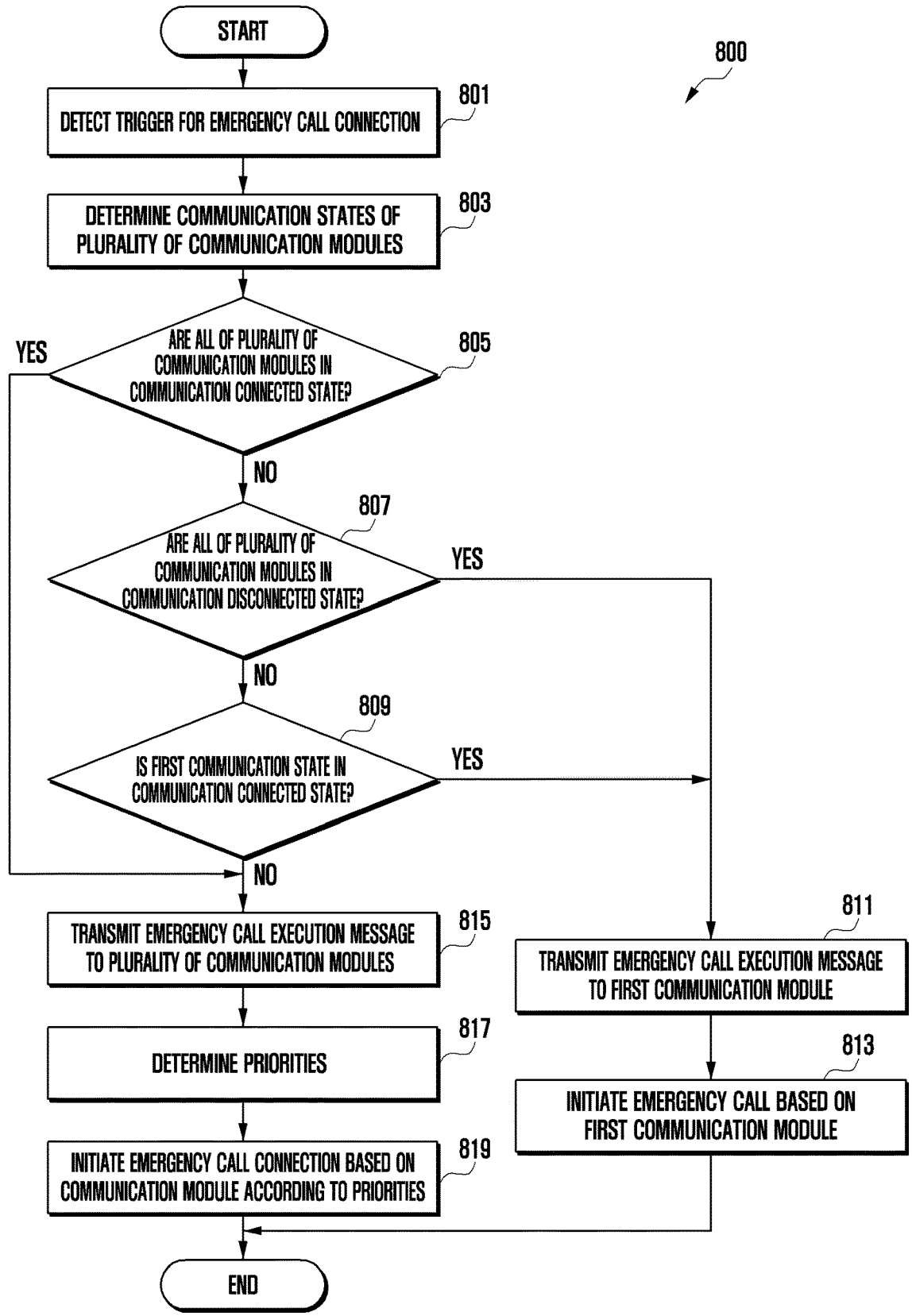
FIG. 8 is a flowchart illustrating an operating method of an electronic device according to various embodiments.

FIG. 8 is a flowchart 800 illustrating an operating method of an electronic device according to various embodiments.

Referring to FIG. 8, in operation 801, the processor 120 of the electronic device (e.g., the electronic device 101 of FIG. 1) may detect a trigger (hereinafter, referred to as "trigger related to an emergency call") for an emergency call connection.

In operation 803, in response to detecting the trigger related to the emergency call, the processor 120 may determine the communication states of a plurality of communication modules (e.g., the first communication module 440 and the second communication module 470 of FIG. 4). According to an embodiment, the processor 120 may determine whether the communication module (or its function) is turned on/off, or whether the communication module is in a state of being connected to a network (e.g., a service state) related to the communication module or in a state of being disconnected from the same (e.g., a non-service state). According to an embodiment, in FIG. 8, an example in which the first communication module is a communication module (e.g., the first communication module 440 in FIG. 4) that connects to a legacy network (e.g., 2G/3G network), and the second communication module is a communication network (e.g., the second communication module 470 of FIG. 4) through which the second communication module is connected to an IMS network is illustrated.

In operation 805, the processor 120 may determine whether all of the plurality of communication modules are in a communication connected state, based at least on a result of the determination in operation 803.

In operation 805, when all of the plurality of communication modules are in the communication connected state (YES of operation 805), the processor 120 may proceed to operation 815 and may perform operations below operation 815. For example, the processor 120 may simultaneously transmit an emergency call execution message to the plurality of communication modules to simultaneously attempt connection related to the emergency call on the basis of the plurality of communication modules.

In operation 805, when all of the plurality of communication modules are not in the communication connected state (NO in operation 805), in operation 807, the processor 120 may determine whether all of the plurality of communication modules are in a communication disconnection connection.

In operation 807, when all of the plurality of communication modules are in the communication disconnected state (YES of operation 807), the processor 120 may proceed to operation 811 and may perform operations below operation 811. For example, the processor 120 may transmit an emergency call execution message to a communication module (e.g., the first communication module 440) of a CS domain (e.g., supporting a circuit switched communication method), thereby attempting a connection related to the emergency call using the communication module of the CS domain.

When all of the plurality of communication modules are not in the communication disconnected state in operation 807 (NO of operation 807), in operation 809, the processor 120 may determine the communication module in which a communication connection is established. For example, the processor 120 may determine whether the first communication module 440 is in the communication connected state or the second communication module 470 is in the communication connected state.

According to an embodiment, in the case of the CS domain, the electronic device 101 may be in a no service state due to instantaneous electric field deterioration. In this case, the electronic device 101 may be immediately switched to the service state due to the movement of the electronic device 101 or a change in the situation of the electric field. In addition, the electronic device 101 may be generally configured to enable constant communication with a CS domain, for example, a legacy network. Accordingly, in various embodiments, when the first communication module 440 is in the disconnected state and only the second communication module 470 of the PS domain is connected, the first communication module 440 and the second communication module 470, it may be effective to deliver an emergency call execution message to all. On the other hand, in the case of the PS domain, the electric field may be deteriorated frequently due to the absence of neighboring base stations (e.g., access points, etc.), and the second communication module 470 (or Wi-Fi function) is inactive (or off). Accordingly, in various embodiments, when the second communication module 470 is in a disconnected state and only the first communication module 440 of the CS domain is connected, it can be effective that the emergency call execution message is transmitted to all of the first communication module 440 and the second communication module 470. On the other hand, in the case of the PS domain, the electric field may be deteriorated frequently due to the absence of neighboring base stations (e.g., access points, etc.), and the second communication module 470 (or Wi-Fi function) may be frequently in an inactive (or off) state. Accordingly, in various embodiments, when the second communication module 470 is in the disconnected state and only the first communication module 440 of the CS domain is in the connected state, it is effective that the emergency call execution message is transmitted using only the first communication module 440.

In operation 809, when it is determined that the communication module in which the communication connection is established is the first communication module 440 based on the determination result of operation 809 (YES of operation 809), in operation 811, the processor 120 may transmit the emergency call execution message to the first communication module 440.

In operation 811, the processor 120 may initiate the emergency call connection based on the first communication module 440.

When it is determined that the communication module in which the communication connection is established is the second communication module 470 based on the determination result of operation 809 (NO of operation 809), in operation 815, the processor 120 may transmit the emergency call execution message to the plurality of communication modules.

In operation 817, the processor 120 may determine, as the target communication module for the emergency call connection, the communication module having a priority (e.g., has received an alerting indication message by a response message (e.g., the first network {e.g., the first network 220 of FIG. 2 or the first network 445 of FIG. 4} and 183 session processing message by the second network {e.g., the second network 260 of FIG. 2 or the second network 475 of FIG. 4} from a network) among the plurality of communication modules.

In operation 819, the processor 120 may initiate the emergency call connection based on the communication module according to the priority.

According to various embodiments, although not shown, the processor 120 may activate the second communication module 470 when the second communication module 470 is in an inactive state (e.g., a communication disconnected state), and may simultaneously transmit the emergency call execution message to the plurality of communication modules. For example, the processor 120 may further include an operation to enable the emergency call connection through VoWiFi.

Figure 9:
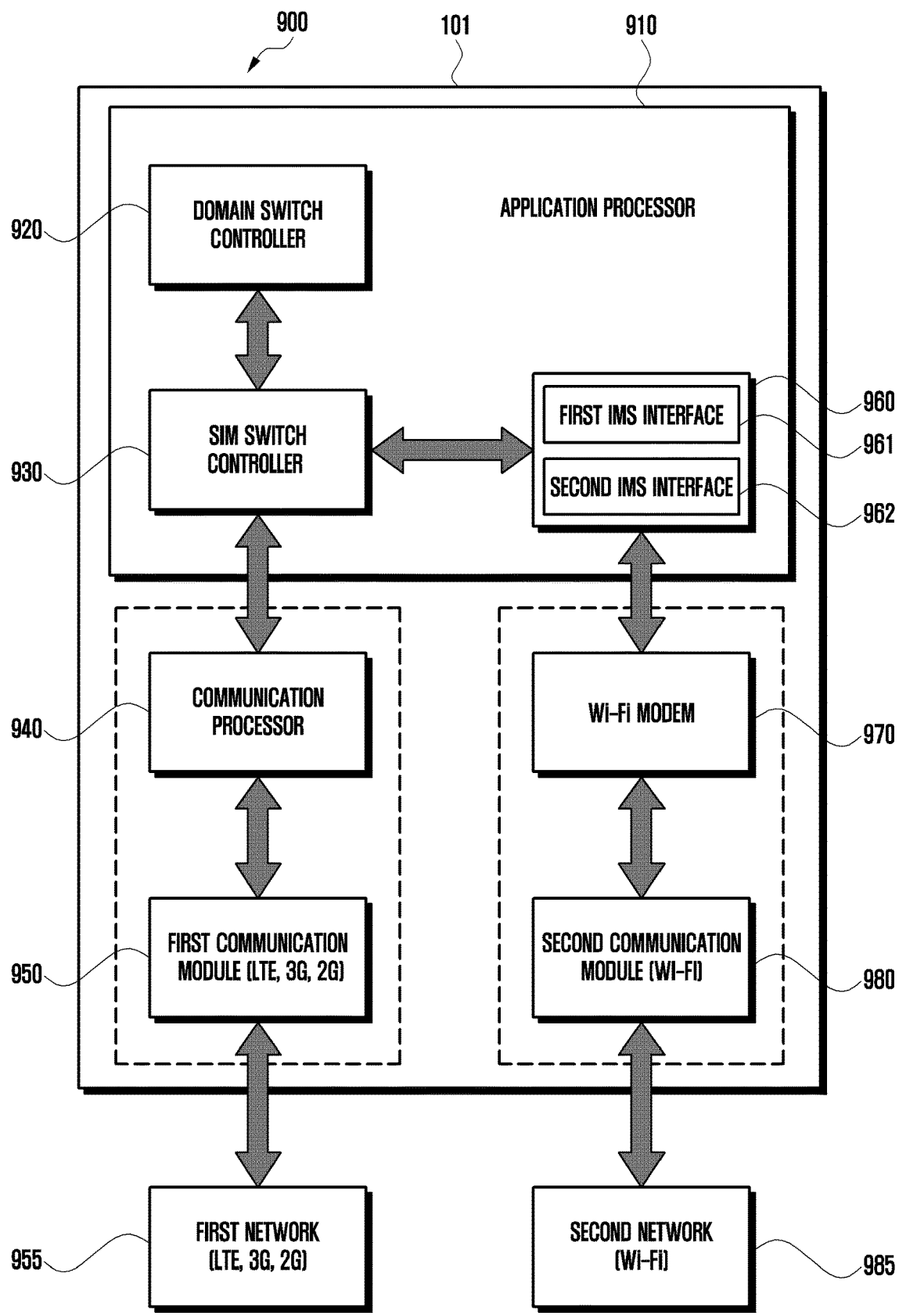
FIG. 9 is a diagram illustrating another example of an internal configuration for an emergency call connection of an electronic device according to various embodiments.

FIG. 9 is a diagram illustrating another example of an internal configuration 900 for an emergency call connection of an electronic device according to various embodiments.

Referring to FIG. 9, the internal configuration of the electronic device (e.g., the electronic device 101 of FIG. 1) for emergency call connection illustrated in FIG. 9 may correspond to the components described in the description with reference to FIG. 4. For example, an application processor 910, a domain switch controller 920, an IMS interface 960, a communication processor 940, a first communication module 950, a Wi-Fi modem 970, and a second communication module 980 of FIG. 9 may correspond to the application processor 410, the domain switch controller 420, the IMS interface 450, the communication processor 430, the first communication module 440, the Wi-Fi modem 460, and the second communication module 470 of FIG. 4, respectively, and detailed descriptions thereof will be omitted.

According to various embodiments, in the example of FIG. 9, the electronic device 101 may include a dual SIM (e.g., a first SIM and a second SIM) (not shown), and the first communication module 950 and the second communication module 980 may be operable based on different SIMs from each other. According to an embodiment, the electronic device 101 may include a first socket and a second socket capable of accommodating the first SIM and the second SIM in the housing, and the first SIM and the second SIM may be accommodated in each of the first socket and the second socket.

According to various embodiments, in the case of the electronic device 101 including the dual SIM, the first communication module 950 may use the CS domain based on the first SIM, and the second communication module 980 may use a VoWiFi service based on the second SIM. For another example, in the case of the electronic device 101 including the dual SIM, the first communication module 950 may use the CS domain based on the second SIM, and the second communication module 980 may use a VoWiFi service based on the first SIM. In this regard, the electronic device 101 may further include an SIM switch controller 930 for switching between the first SIM and the second SIM, and the IMS interface 960 may include a first IMS interface 961 for the first SIM and a second IMS interface 962 for the second SIM.

According to various embodiments, the electronic device 101 supporting the dual SIM may determine a network in which the first SIM and the second SIM are currently camped on through the SIM switch controller 930. According to an embodiment, the application processor 910 may determine the camped-on network for each of the first SIM and the second SIM, and may determine an emergency call connection method for the first communication module 950 and the second communication module 980 based on the determination of the camped-on network for each SIM. For example, by using the communication module matched for each SIM, the emergency call may be connected to a cellular domain or a Wi-Fi domain for each communication module. According to an embodiment, the first communication module 950 may be connected to the first network using the first SIM, and the second communication module 980 may be connected to the second network using the second SIM.

According to various embodiments, in the case of a method in which the first communication module 950 and the second communication module 980 use different antennas based on the first SIM and the second SIM, the electronic device 101 may transmit an emergency call attempted through the communication module related to the first SIM by the SIM switch controller 930, to the communication module related to the second SIM. Through this, it is possible to simultaneously attempt to perform the emergency call connection through the communication module related to the first SIM and the communication module related to the second SIM.

As described above, a method for an emergency call connection by the electronic device 101 according to various embodiments may include: detecting a trigger for an emergency call connection; in response to the trigger, initiating the emergency call connection on the basis of a first communication module and a second communication module; determining priorities of the first communication module and the second communication module; and performing the emergency call connection using the communication module according to the determined priorities.

According to various embodiments, the initiating the emergency call connection may include simultaneously transmitting an execution message for the emergency call connection to the first communication module and the second communication module.

According to various embodiments, the determining the priorities may include determining the priorities based on reception of a response message from a network corresponding to each of the first communication module and the second communication module.

According to various embodiments, the determining the priorities may include determining the communication module of the first communication module or the second communication module, which first receives the response message from the corresponding network, as a target communication module for the emergency call connection.

According to various embodiments, the performing the connection may include transmitting a termination message for terminating the start of the emergency call connection to another communication module except the target communication module.

According to various embodiments, an operating method of the electronic device 101 may include: determining a communication state of each of the first communication module and the second communication module in response to the trigger; simultaneously transmitting an emergency call execution message to the first communication module and the second communication module when the first communication module and the second communication module are in a communication connected state; transmitting the emergency call execution message to the first communication module when the first communication module of a cellular domain is in the communication connected state; and simultaneously transmitting the emergency call execution message to the first communication module and the second communication module when the second communication module of a PS domain is in the communication connected state.

According to various embodiments, the electronic device 101 may include a first SIM and a second SIM, and the operating method may include determining a camped-on network for each of the first SIM and the second SIM; and determining an emergency call connection method for the first communication module and the second communication module based on the determination of the camped-on network.

According to various embodiments, the first communication module and the second communication module may be configured to use different radio access technologies (RATs).

According to various embodiments, the first communication module and the second communication module may be formed to use different antennas that are physically separated.

According to various embodiments, the first network and the second network may use different frequency bands.

Various embodiments of the disclosure disclosed in the specification and drawings are provided only to provide specific examples to easily explain the technical content of the disclosure and to aid understanding of the disclosure, and are not intended to limit the scope of the disclosure. Therefore, the scope of the disclosure should be construed that all changes or modified forms derived based on the technical idea of the disclosure in addition to the embodiments disclosed herein are included in the scope of the disclosure.

The invention claimed is:
1. An electronic device comprising:
a first communication circuit configured to communicate with a circuit switched (CS)-based first network;
a second communication circuit configured to communicate with a packet switched (PS)- based second network; and
a processor,
wherein the processor is configured to:
detect a trigger for an emergency call connection;
in response to detecting the trigger, determine respective communication states of the first communication circuit and the second communication circuit;
when the first communication circuit and the second communication circuit are in a service state, and when the first communication circuit of a CS domain is in a no service state and the second communication circuit of a PS domain is in a service state, simultaneously transmit an emergency call execution message to the first network and the second network, respectively through the first communication circuit and the second communication circuit;
select one of the first communication circuit and the second communication circuit as a target communication circuit for executing the emergency call, based on determining which of the first communication circuit and the second communication circuit first receives a response message corresponding to the transmitted emergency call execution message;

after selecting the target communication circuit, perform the emergency call connection using the selected target communication circuit;

when the first communication circuit of the CS domain is in a service state and the second communication circuit of the PS domain is in a no service state, transmit the emergency call execution message to the first network through the first communication circuit in absence of transmission through the second communication circuit; and after transmitting the emergency call execution message through the first communication circuit in absence of transmission through the second communication circuit, perform the emergency call connection using the first communication circuit.

2. The electronic device of claim 1, wherein the processor is configured to:

transmit a termination message requesting termination of initiation of the emergency call connection to a network associated with another communication circuit different from the target communication circuit, and terminate a process related to the initiation of the emergency call connection with the network.

3. The electronic device of claim 1, further comprising:

a first subscriber identification module (SIM) and a second SIM, wherein the processor is configured to:

determine a camp-on network for each of the first SIM and the second SIM; and determine an emergency call connection method for the first communication circuit and the second communication circuit on the basis of the determination of the camp-on network.

4. The electronic device of claim 1, wherein the first communication circuit and the second communication circuit are configured to use different radio access technologies (RATs).

5. The electronic device of claim 1, wherein:

the first communication circuit and the second communication circuit use different antennas that are physically separated, and the first network and the second network use different frequency bands.

6. The electronic device of claim 1, wherein the processor is configured to:

receive a user input requesting an emergency call through a user interface;

in response to the user input, execute a first attempt to establish first communication via a first network using the first communication circuit;

execute a second attempt to establish second communication via a second network different from the first network using the second communication circuit before termination of the first attempt;

receive a connection confirmation signal from at least one of the first network or the second network;

select a network from among the first network or the second network according to the connection confirmation signal; and execute an emergency call using the selected network.

7. The electronic device of claim 6, wherein the processor is configured to execute the second attempt at a same time as the first attempt.

8. The electronic device of claim 6, wherein the processor is configured to:

receive a connection confirmation signal from any one of the first network or the second network, and release a connection attempt to the other of the first network or the second network when the connection confirmation signal is received.

9. The electronic device of claim 1, wherein:

the first communication circuit is configured to transmit and/or receive a first signal within a first frequency range of 800 MHz to 2.1 GHz, the second communication circuit is configured to transmit and/or receive a second signal within a second frequency range outside the first frequency range, and the second frequency range includes a range of 2GHz to 5GHz.

10. The electronic device of claim 6, further comprising:

a first antenna and a second antenna spaced apart from the first antenna, wherein the first communication circuit is electrically connected to the first antenna and the second communication circuit is electrically connected to the second antenna.

11. The electronic device of claim 6, further comprising:

a first socket and a second socket respectively configured to accommodate a first subscriber identification module (SIM) and a second SIM, wherein the first communication circuit is connected to the first network using the first SIM and the second communication circuit is connected to the second network using the second SIM.

12. The electronic device of claim 6, wherein the first communication circuit supports a circuit switched communication method, and the second communication circuit supports a non-circuit switched communication method.

13. An operating method of an electronic device, comprising:

detecting a trigger for an emergency call connection;

in response to detecting the trigger, determining respective communication states of a first communication circuit configured to communicate with a circuit switched (CS)-based first network and a second communication circuit configured to communicate with a packet switched (PS)-based second network;

when the first communication circuit and the second communication circuit are in a service state, and when the first communication circuit of a CS domain is in a no service state and the second communication circuit of a PS domain is in a service state, simultaneously transmitting an emergency call execution message to the first network and the second network respectively through the first communication circuit and the second communication circuit;

selecting one of the first communication circuit and the second communication circuit, as a target communication circuit for the emergency call, based on determining which of the first communication circuit and the second communication circuit first receives a response message corresponding to the transmitted emergency call execution message;

after selecting the target communication circuit, performing the emergency call connection using the selected target communication circuit;

when the first communication circuit of the CS domain is in a service state and the second communication circuit of the PS domain is in a no service state, transmitting the emergency call execution message to the first network through the first communication circuit in absence of transmission through the second communication circuit; and after transmitting the emergency call execution message through the first communication circuit in absence of transmission through the second communication circuit, performing the emergency call connection using the first communication circuit.

\* \* \* \* \*